Nov. 27, 1962 C. E. CAMERON 3,065,942
INSTRUMENT MOUNTING DEVICE
Filed June 22, 1960 2 Sheets-Sheet 1
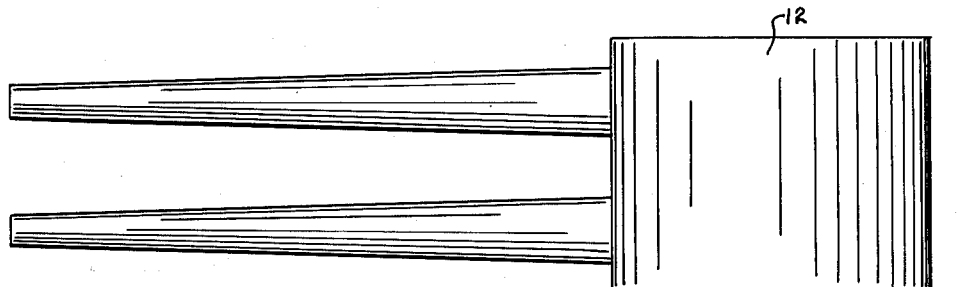
FIG. 1
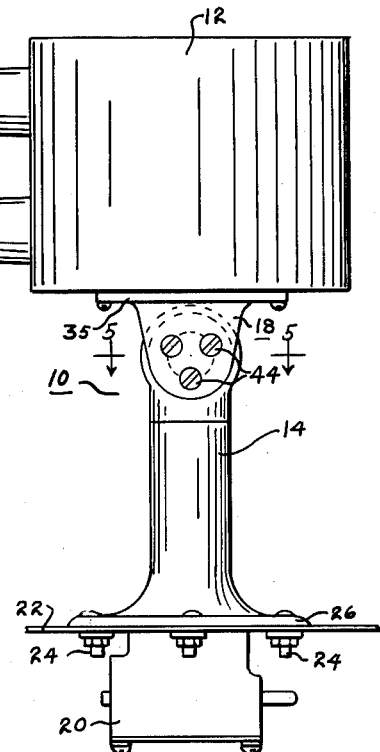
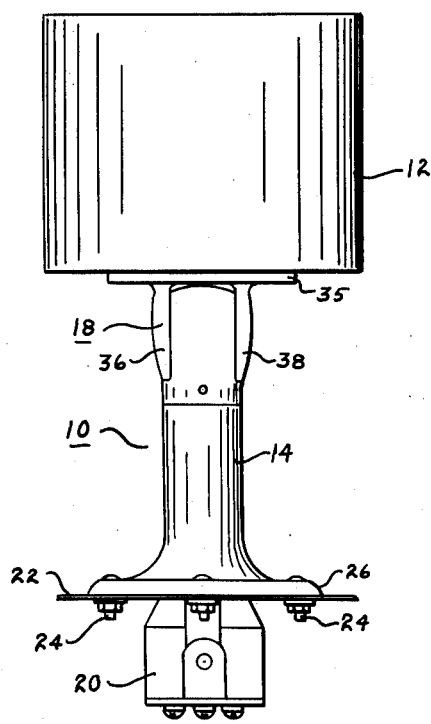
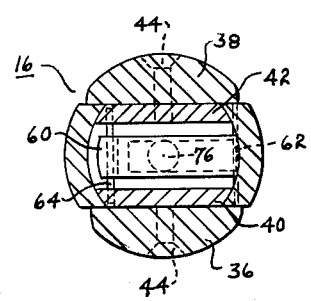
FIG. 5
FIG. 2
INVENTOR.
COLIN E. CAMERON
BY
ATTORNEY Nov. 27, 1962     C. E. CAMERON     3,065,942

INSTRUMENT MOUNTING DEVICE

Filed June 22, 1960     2 Sheets—Sheet 2

INVENTOR.
COLIN E. CAMERON
BY
*M. A. Hobby*
ATTORNEY 3,065,942
INSTRUMENT MOUNTING DEVICE
Colin E. Cameron, 201 6th, Winona Lake, Ind.
Filed June 22, 1960, Ser. No. 38,045
7 Claims. (Cl. 248—27)

The present invention relates to an instrument mounting device, and more particularly to a mounting device for remote operation of radar antenna used in traffic control and the like, and for remote control positioning of search or spot lights, rear view mirrors, and reflectors for vehicles such as automobiles, boats and aircraft.

The mounting and installation of search lights, radar antenna and similar equipment frequently can not be mounted on automobiles, boats or aircraft in locations permitting direct manual control and operation or indirect control and operation by a simple linkage or shafts and gear train. Although this installation difficulty may be overcome by the use of electrical controls involving one or more motors or solenoids, this type of control mechanism is often expensive in construction and maintenance, and sometimes has its own inherent difficulties of installation in that special electrical circiuts and controls may not be compatible with the electrical system of the particular vehicle. Mounting devices controlled by flexible cables and the like have been tried and have been used commercially to a limited extent, but this type of unit also has certain inherent disadvantages, including failure to maintain its adjusted position and difficulty in accurately positioning the instrument. It is therefore one of the principal obejcts of the present invention to provide a mounting device for instruments of the aforementioned types, which can be readily mounted on a vehicle in locations remote from the operator and thereafter easily and accurately controlled through the use of a single conveniently located hand control.

Another object of the invention is to provide a device for pivotally and rotatively mounting instruments such as radar antennas, search lights, rear view mirrors and the like on vehicles, which rotates the instrument on a vertical axis through 360 degrees and oscillates the instrument through approximately a ninety degree angle irrespective of the position of the instrument on its vertical axis.

Still another object of the invention is to provide a device for positioning and manipulating instruments of the aforesaid type on automobiles, boats and aircraft, which responds immediately and accurately to the operator's control and which will maintain the desired instrument position regardless of vibration and jarring of the vehicle on which the device is installed.

A further object is to provide a device of the aforesaid type which is adapted for remote control through either a manually or electrically operated mechanism.

Another object of the invention is to provide a compact sturdy device for mounting a radar antenna, search light or the like on a vehicle which gives rigid support to the instruments and which can be adjusted in small increments to give the desired instrument setting.

Another object is to provide a mounting device of the foregoing type which does not require any intricate machining or complicated assembling operations and which will give long, trouble-free performance without being serviced over long periods of time.

Additional objects and advantages of the invention will become apparent from the following description and accompanying drawings, wherein:

FIGURE 1 is a side elevational view of my instrument mounting device showing it secured in place on a vehicle and having a radar antenna of the type used in handling highway traffic and the like;

FIGURE 2 is an end elevational view of the instrument mounting device shown in FIGURE 1, being mounted on a vehicle and supporting the radar antenna;

FIGURE 5 is a cross sectional view taken on line 5—5 of FIGURE 1.

Figure 3:
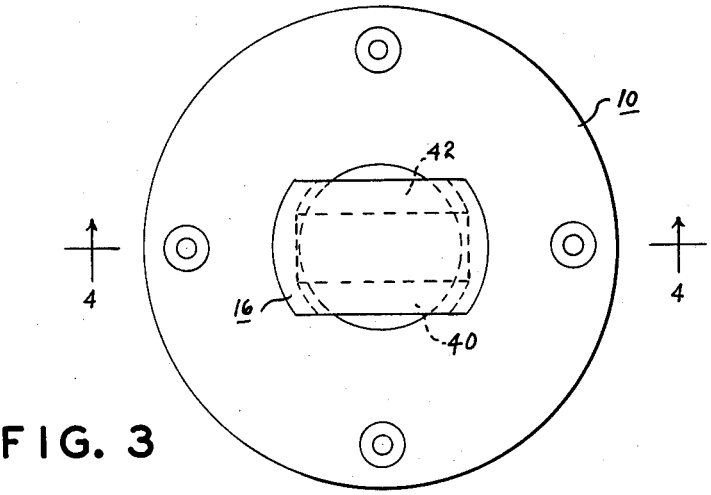
FIGURE 3 is a top plan view of the mounting device shown in FIGURES 1 and 2 with the antenna and bracket therefore removed from the device to better illustrate the construction of the device.

Referring more specifically to the drawings, numeral 10 designates generally the present instrument mounting device having in the embodiment shown a radar antenna unit 12, and consisting of a base 14, a rotatable head 16, an oscillating bracket 18 pivotally mounted on the head and supporting the antenna unit, and a housing 20 of the control and operating mechanism for the rotatable head and oscillating bracket. The device is shown mounted on a metal wall or panel 22 of a vehicle such as the front fender of an automobile or the deck of a boat, and is secured thereto by a plurality of bolts 24 extending downwardly through holes in the flange 26 around the bottom of base 14 and through holes in panel 22. The base is preferably constructed of metal and has a cylindrical shaped body portion 27 with a longitudinal hole 28 therethrough for the parts connecting the control and operating mechanism in housing 20 with rotatable head 16 and oscillating bracket 18.

Head 16 is ring shaped and contains a chamber 29, is seated on the upper end of base 14, and is secured to and rotated by hollow tubular shaft 30 extending upwardly from the control and operating mechanism in housing 20 through hole 28 in the base and joined rigidly to head 16 by one or more set screws 32 extending through the lower portion of the head into the upper end of shaft 30. The upper end of the shaft contains a bearing 33 which is held firmly in place in head 16 by the set screws, and the lower end of the shaft contains a sleeve 34 rotatably mounted therein. Bracket 18 is supported on head 16 and consists of a plate-like portion 35 having a plurality of holes therethrough for screws or bolts used in attaching an instrument in place on portion 35, and arms 36 and 38 extending downwardly from said portion on opposite sides of head 16. The bracket is rotatably supported on the head by disc-shaped inserts 40 and 42 seated in opposite sides of chamber 29 and rotatably held therein by arms 36 and 38, respectively, each of which is attached to the corresponding arm by a plurality of screws 44. Shaft 30 is journalled in bearing 33 in the upper end of base 14 and sleeve 34 in a cylindrical extension 50 of housing 20, said extension telescoping into the hollow interior of base 14 and being retained therein by a plurality of screws 52 extending downwardly through panel 22 into the upper part of the housing and thereby supporting the housing in operating position beneath the panel and permitting adjustment of the housing longitudinally in base 14 to adapt the unit to panels of various thicknesses. Mounted rigidly on the lower end of shaft 30 is a beveled gear 53 which is driven in either direction by the present control and operating mechanism to be fully described hereinafter.

Inserts 40 and 42 are rotated in unison to rock bracket 18 to the right and left, as shown in FIGURE 1, by a lever 60 pivoted on a pin 62 to the internal wall of head 16 and connected to the two inserts by a pin 64 extending through bifurcated end 66 of lever 60. The lever is oscillated on pin 62 by a shaft 68 pivotally connected to lever 60 near the center thereof and extending downwardly through bearing 33 and shaft 30 and into rotatable sleeve 34, the lower end of shaft 68 and axial bore 72 of sleeve 34 having intermeshing screw threads which move the shaft upwardly or downwardly upon rotation of the sleeve in one direction or the other. A gear 74 is secured to the lower end of sleeve 34 and is driven in either direction by the present control and operating mechanism contained in housing 20. The enlarged upper end 76 of shaft 68 seats in a longitudinal slot 78 in lever 60 and, as shaft 68 is shifted upwardly and downwardly by rotation of sleeve 34, it moves the left end of lever 60 upwardly and downwardly and thereby rotates inserts 40 and 42 to oscillate bracket 18.

The control and operating mechanism enclosed in housing 20 consists of a longitudinally shiftable shaft 80 journalled in bores in opposite end walls 82 and 84 of the housing and having mounted thereon for relative rotation with the shaft a beveled gear 86 intermeshing with beveled gear 74 secured to rotatable sleeve 34. The end wall 82 internal wall of the adjacent end of housing 20. A second beveled gear 90 is also mounted on shaft 80 adapted for relative rotation therewith and intermeshing with beveled gear 4 secured to rotatable sleeve 34. The end wall 82 of the housing is removable in order to assist in assembling the shaft 80 and gears 86 and 90 in place in the housing, and a removable plate 92 secured to the bottom of the housing by screws 94 permits easy access to the operating mechanism for servicing and repair. A clutch member 96 is mounted on and rigidly secured to shaft 80 between gears 86 and 90 and contains a plurality of projections 98 and 100 on opposite sides for interlocking with corresponding projections 102 and 104 on gears 86 and 90, respectively, when the shaft is shifted axially from its neutral position shown in FIGURE 4 to the right or left. Shaft 80 is shifted axially to engage clutch 96 with gears 86 and 90 and to rotate said gears by a suitable flexible cable 106 attached by a fixture 108 to one end or the other of shaft 80, which imparts both rotative and axial movement to the shaft.

Figure 4:
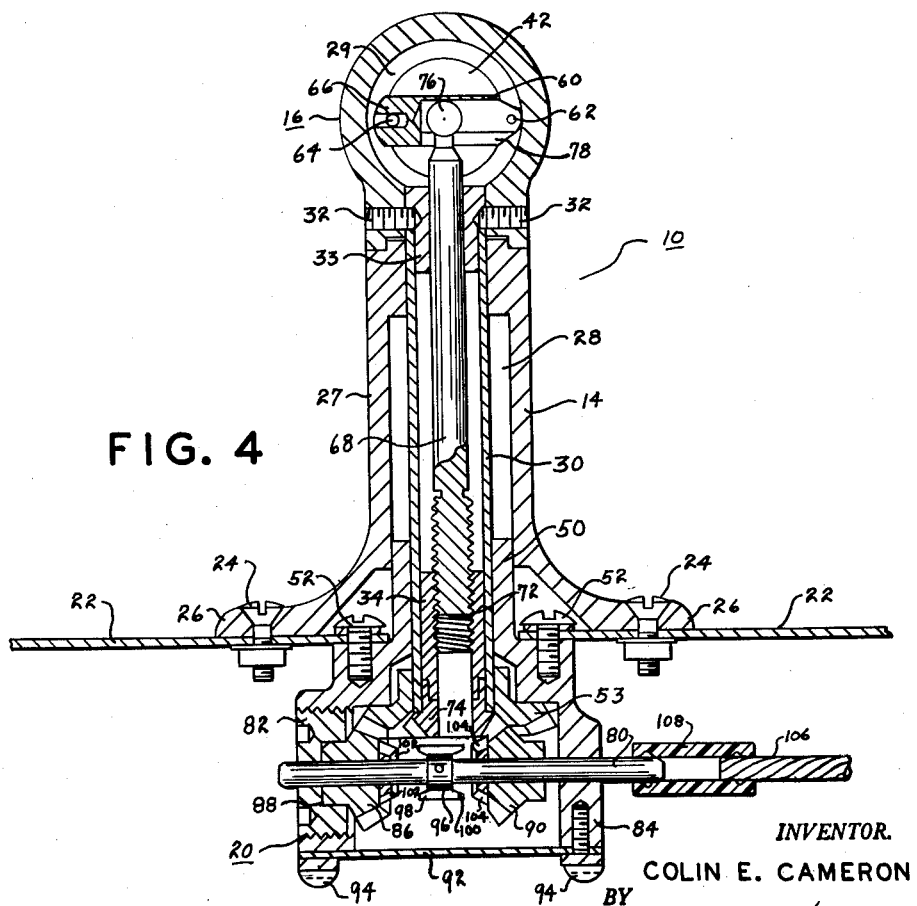
FIGURE 4 is a vertical cross sectional view of the present mounting device taken on line 4—4 of FIGURE 3, showing the bracket for supporting an instrument removed and the device mounted on the housing or other supporting structure forming part of a vehicle on which the device is mounted.

In the operation of the present instrument mounting device which has been mounted on the front fender of an automobile, boat deck, or the like, in the manner shown in the drawings, the vehicle operator tilts the radar antenna upwardly by shifting shaft 80 to the right, as viewed in FIGURE 4, using the cable 106 (or Bowden wire), to the point at which projections 100 on clutch 96 are firmly interlocked with projections 104 on beveled gear 90, and then rotating the shaft counter-clockwise as viewed in FIGURE 2, using the flexible cable 106, causing gears 90 and 74 and sleeve 34 to rotate. The rotation of the sleeve in this direction screws shaft 68 upwardly, thereby forcing the bifurcated end 66 of lever 60 upwardly. This in turn rotates inserts 40 and 42 in the clockwise direction as viewed in FIGURE 1 and likewise rotates bracket 18 and the antenna in the clockwise direction. After the desired angular position of the antenna has been obtained by the foregoing manipulation, the antenna is positioned on its vertical axis by moving shaft 80 to its left, as shown in FIGURE 4, until projections 98 of clutch 96 are firmly interlocked with projections 102 of gear 86. Thereafter rotation of shaft 80 rotates beveled gears 86 and 53 and shaft 30 which in turn rotates head 16, bracket 18 and the radar antenna to the desired position. In order to tilt the antenna downwardly, shaft 80 is rotated in the clockwise direction while clutch 96 is interlocked with gear 90. The sequence of operation in adjusting the instrument on its horizontal axis and then on its vertical axis may be reversed or alternated from one to the other manipulation until the desired position of the instrument is obtained.

The present instrument mounting device can easily be operated exclusively by simple, readily available electrical components. A reversible electric motor may be attached to one end of shaft 80 for rotating gears 86 and 90 in the manner described above, and a solenoid may be attached to the other end of the shaft for shifting the shaft axially to engage clutch 96 with either of the two gears depending upon the desired adjustment. The motor and solenoid can be effectively operated by conventional controls located in the driver's compartment or other place remote from the mounting device.

While several modifications and changes have been described with reference to the present instrument mounting device, various other modifications and changes may be made without departing from the scope of the present invention.

I claim:

1. A device for mounting spotlights, radar antennas, rear view mirrors and similar instruments on a panel-like support, comprising a base having a cylindrical body portion with a longitudinal hole therethrough and a flange at the bottom thereof for seating on the external surface of a supporting panel, a head mounted for rotation on a vertical axis on said body portion and having a cylindrical passage extending therethrough on a transverse axis, a bracket having an instrument support member and two arms extending on opposite sides of said head at the ends of the passage therethrough, a rotatable insert mounted in each end of the passage through said head and being rigidly secured to the respective arm of said bracket, a lever in the passage of said head pivoted at one end to the wall thereof and at the other end to said inserts, a hollow shaft extending longitudinally in said base and rigidly connected to said head for rotation therewith, a beveled gear on the end of said shaft opposite said head, a shaft in said hollow shaft connected at one end to said lever and having screw threads on the opposite end, a rotatable sleeve means having a threaded part intermeshing with the screw threads on said second mentioned shaft, a beveled gear connected to said sleeve means, an axially shiftable shaft extending transverse to said first and second mentioned shafts, a beveled gear mounted on said transverse shaft and intermeshing with the gear on said hollow shaft, another beveled gear on said transverse shaft intermeshing with said second mentioned gear, a clutch means secured to said transverse shaft for selectively connecting said transverse shaft with the gears mounted thereon, means for shifting said transverse shaft longitudinally for operating said clutch means, means for rotating said transverse shaft, and a housing for said gears having a stem telescopically disposed in the hole of said body portion.

2. An instrument mounting device, comprising a base with a longitudinal hole therethrough, a head mounted for rotation on a longitudinal axis on said base and having a cylindrical passage extending therethrough on a transverse axis, a bracket having an instrument support member and two arms extending on opposite sides of said head at the ends of the passage therethrough, a rotatable insert mounted in each end of the passage through said head and being rigidly secured to the respective arm of said bracket, a lever in the passage of said head pivoted at one end to the wall thereof and at the other end to said inserts, a hollow shaft extending longitudinally in said base and rigidly connected to said head for rotation therewith, a beveled gear on the end of said shaft opposite said head, a shaft in said hollow shaft connected at one end to said lever and having screw threads on the opposite end, a rotatable sleeve means having a threaded part intermeshing with the screw threads on said second mentioned shaft, a beveled gear connected to said sleeve means, an axially shiftable shaft extending transverse to said first and second mentioned shafts, a beveled gear mounted on said transverse shaft and intermeshing with the gear on said hollow shaft, another beveled gear on said transverse shaft intermeshing with said second mentioned gear, a clutch means secured to said transverse shaft for selectively connecting said transverse shaft with the gears mounted thereon, and means for rotating and longitudinally shifting said transverse shaft.

3. An instrument mounting device, comprising a base with a longitudinal hole therethrough, a head mounted for rotation on a longitudinal axis on said base and having a cylindrical passage extending therethrough on a transverse axis, a bracket having an instrument support member and two arms extending on opposite sides of said head at the ends of the passage therethrough, a rotatable insert mounted in each end of the passage through said head and being rigidly secured to the respective arm of said bracket, a lever in the passage of said head pivoted at one end to the wall thereof and at the other end to said inserts, a hollow shaft extending longitudinally in said base and rigidly connected to said head for rotation therewith, a gear on the end of said shaft opposite said head, a shaft in said hollow shaft connected at one end to said lever and having screw threads on the opposite end, a rotatable sleeve means having a threaded part intermeshing with the screw threads on said second mentioned shaft, a gear connected to said sleeve means, an axially shiftable shaft extending transverse to said first and second mentioned shafts, a gear mounted on said transverse shaft and intermeshing with the gear on said hollow shaft, another gear on said transverse shaft intermeshing with said second mentioned gear, and a clutch means secured to said transverse shaft for selectively connecting said transverse shaft with the gears mounted thereon.

4. An instrument mounting device, comprising a base with a longitudinal hole therethrough, a head mounted for rotation on a longitudinal axis on said base and having a passage extending therethrough on a transverse axis, a bracket having an instrument support member and two arms extending on opposite sides of said head at the ends of the passage therethrough, a lever in the passage of said head pivoted at one end to the wall thereof and being connected at the other end to said arms, a hollow shaft extending longitudinally in said base and rigidly connected to said head for rotation therewith, a gear on the end of said shaft opposite said head, a shaft in said hollow shaft connected at one end to said lever and having screw threads on the opposite end, a rotatable means having a threaded part intermeshing with the screw threads on said second mentioned shaft, a gear connected to said means, an axially shiftable shaft extending transverse to said first and second mentioned shafts, a gear mounted on said transverse shaft and intermeshing with the gear on said hollow shaft, another gear on said transverse shaft intermeshing with said second mentioned gear, and a clutch means secured to said transverse shaft for selectively connecting said transverse shaft with the gears mounted thereon.

5. An instrument mounting device, comprising a base with a longitudinal hole therethrough, a head mounted for rotation on a longitudinal axis on said base and having a passage extending therethrough on a transverse axis, a bracket having an instrument support member, a lever connected at one end to said head and at the other end to said bracket, a hollow shaft extending longitudinally in said base and rigidly connected to said head for rotation therewith, a gear on the end of said shaft opposite said head, a shaft in said hollow shaft connected at one end to said lever and having screw threads on the opposite end, a rotatable means having a threaded part intermeshing with the screw threads on said second mentioned shaft, a gear connected to said means, a shaft extending transverse to said first and second mentioned shafts, a gear mounted on said transverse shaft and intermeshing with the gear on said hollow shaft, another gear on said transverse shaft intermeshing with said second mentioned gear, and a clutch means secured to said transverse shaft for selectively connecting said transverse shaft with the gears mounted thereon.

6. An instrument mounting device, comprising a base, a head mounted for rotation on a longitudinal axis on said base, a bracket having an instrument support member, a lever connected at one end to said head and at the other end to said bracket, a shaft in said base connected to said head for rotation therewith, a gear on the end of said shaft opposite said head, a second shaft connected at one end to said lever and having screw threads on the opposite end, a rotatable means having a threaded part intermeshing with the screw threads on said second mentioned shaft, a gear connected to said means, an axially shiftable shaft extending transverse to said first and second mentioned shafts, a gear mounted on said transverse shaft and intermeshing with said first mentioned gear, another gear on said transverse shaft intermeshing with said second mentioned gear, and a clutch means secured to said transverse shaft for selectively connecting said transverse shaft with the gears mounted thereon.

7. An instrument mounting device, comprising a base with a longitudinal hole therethrough, a head mounted for rotation on a longitudinal axis on said base and having a passage extending therethrough on a transverse axis, a bracket having an instrument support member and two arms extending on opposite sides of said head at the ends of the passage therethrough, a rotatable insert mounted in each end of the passage through said head and being rigidly secured to the respective arm of said bracket, a lever in the passage of said head pivoted at one end to the wall thereof and at the other end to said inserts, a hollow shaft extending longitudinally in said base and rigidly connected to said head for rotation therewith, a shaft in said hollow shaft connected at one end to said lever and having screw threads on the opposite end, a rotatable sleeve means having a threaded part intermeshing with the screw threads on said second mentioned shaft, and means for selectively rotating said first mentioned shaft and shifting said second mentioned shaft longitudinally.

References Cited in the file of this patent

UNITED STATES PATENTS

| | | |
|---|---|---|
| 1,830,355 | Farr | Nov. 3, 1931 |
| 2,315,260 | Lancaster | Mar. 30, 1943 |
| 2,855,825 | Feder | Oct. 14, 1958 |